Feb. 22, 1966 F. STERZER 3,237,011
OPTICAL HETERODYNE DEMODULATOR
Filed Feb. 4, 1963 2 Sheets-Sheet 1

INVENTOR.
FRED STERZER
BY
Attorney

INVENTOR.
FRED STERZER

United States Patent Office 3,237,011
Patented Feb. 22, 1966

3,237,011
OPTICAL HETERODYNE DEMODULATOR
Fred Sterzer, Princeton, N.J., assignor to Radio Corporation of America, a corporation of Delaware
Filed Feb. 4, 1963, Ser. No. 256,000
7 Claims. (Cl. 250—199)

This invention relates to improved means for demodulation of a signal modulated light beam.

Devices are known for producing coherent electromagnetic radiation in the light spectrum, e.g. the infrared and the visible. One such device is a laser which provides "light amplification by stimulating emission of radiation." The laser device is most commonly used as a source of coherent light. Also known are devices, e.g. electro-optic cells, for amplitude modulating a coherent light beam. These electro-optic devices have been proposed for modulating a laser beam with signal information for use in a light communication system.

A laser may include, for example, an active material that will produce the stimulated emission of radiation, an excitation source that pumps power into the active material, and a resonant structure or cavity. An example of a light modulator is an electro-optic cell positioned between crossed polarizers. The electro-optic cell may be, for example, a crystal of cuprous chloride between two electrodes.

A typical laser communication system includes means to amplitude modulate the light output from the laser with signal information. The amplitude modulated light may then be transmitted, from one location to another, where the signal modulated light must be demodulated and detected in the receiver. This type of communication system is useful in applications such as optical radar and optical communication systems.

One type of detector which has been proposed for such a light communication system is a simple photocell. It has been found that this type of detector does not have the desired wide band width coupled with the desired high sensitivity for wide band optical communication systems.

Another type of detector, which has been used in the prior art, is a traveling wave tube having a photocathode input. In this type of detector, photo-electrons, produced by the amplitude modulated light beam landing on the photocathode, are bunched at the modulation frequency of the amplitude modulated light beam. These bunched electrons pass through a traveling wave tube type helix and excite the helix with the signal which is taken out at the output coupler. The range of modulation frequencies that these tubes can demodulate is generally determined by the bandwidth of the microwave circuit, and that of the output coupler. Helices have the greatest bandwidth of known structures and can be designed to interact efficiently with electrons bunched at various frequency ranges. However, when considering the demodulation of light beams in a communication system, it is desirable to have the receiver capable of receiving many widely spaced frequencies, without the necessity of substituting different tubes designed for particular different frequency ranges.

A further disadvantage of a conventional traveling wave tube type detector is that the output power obtainable, for a given input modulation, is somewhat limited.

A further disadvantage of conventional traveling wave tubes, when used as a light demodulator, is that, when the signal is weak, the length of a tube necessary for efficient interaction becomes excessively long.

It is therefore an object of this invention to provide a novel light sensitive detector system.

It is another object of this invention to provide a new and novel microwave phototube heterodyning device.

It is a further object of this invention to provide an improved means for demodulating modulated light beams.

These and other objects are accomplished in accordance with this invention by providing a detector system for detecting a modulated light beam including a traveling wave tube equipped with a photosensitive input cathode. The traveling wave tube is also equipped with an input coupler helix which is connected to a local oscillator which provides a microwave heterodyne signal to the tube. The local oscillator signal frequency is selected to interact with the modulation frequency of the "bunched" signal photo-electrons to produce an output signal. The output signal includes one of two frequencies, i.e. the sum frequency or the difference frequency, of the frequency of the electrical signal provided by the local oscillator and the modulation frequency of the photo-electrons produced by a signal modulated light beam. Thus, a system in accordance with this invention is capable of operating at frequencies both less than and greater than the frequency range for which the helix of the tube is normally designed to operate when either the difference frequency or the sum frequency is within the frequency range of the helix. Efficient detectors operable over a substantially broader frequency range thus are produced using this invention. In one embodiment of this invention, an optical local oscillator type signal may also be provided to further heterodyne several different frequencies which will extend the frequency capabilities still further. The traveling wave tube may be made shorter because of the slowing of the electrons caused by the local oscillator signal resulting in more efficient signal extraction.

The invention will be described in greater detail by reference to the accompanying drawings wherein.

Figure 1:
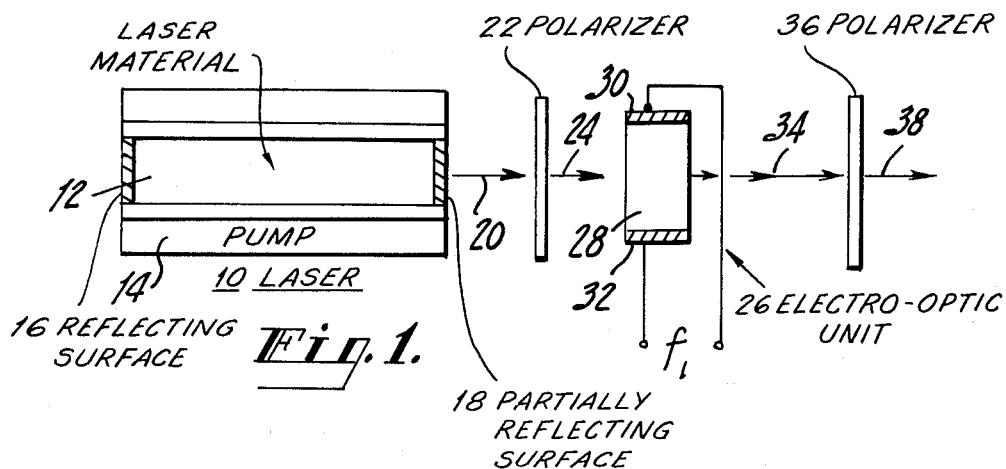
FIG. 1 is a partially schematic illustration of a transmitting station of a communication system.

FIG. 1 shows a light transmitting device comprising an apparatus 10, for producing coherent radiation, i.e. a laser. The laser 10 generally comprises an active material 12, a pumping source 14, and a pair of optical reflecting surfaces 16 and 18. The optical reflecting surfaces 16 and 18 form the ends of a resonant body or cavity.

The active material 12 may comprise any known substance which has at least two atomic states, or energy levels, separated by an amount corresponding to the desired output frequency. The active material 12 has the property of being excitable into an inverted population density condition, i.e. an excess population is established in the upper of two energy states. The active material 12 emits coherent light as the atomic particles return from the higher energy level to the lower energy level. The active material may comprise a solid, such as doped ruby crystal or a semiconductor such as gallium arsenide; or a gas, such as a helium-neon gas mixture.

The pumping source 14 may comprise any source of energy which is capable of exciting the molecules or ions in the active material 12 from a lower energy level into the higher energy level. In other words, the pumping source 14 is a source of energy which is capable of establishing the inverted population density condition in the active material 12. Examples of such pumping sources are means for providing a radio frequency field, a xenon flash tube or other suitable, known types of energy sources.

The gallium arsenide semiconductor type of laser may be electrically pumped by voltages applied to electrodes connected to the opposite sides of a p-n junction.

The active material is positioned in a resonant cavity. The ends of the resonant cavity are formed by two light reflecting surfaces 16 and 18, e.g. polished silver may be used. In certain structures, the interface between the active material 12 and air, because of different indices of refraction, may provide sufficient light reflection to produce the resonant cavity and separate light reflecting surfaces 16 and 18 may be omitted. One of the light reflecting surfaces 18 is partially transparent, or includes a portion that is partially transparent, to permit the passage of a coherent light beam 20, having a frequency $f_0$, from the device 10.

A more detailed description of laser structures, operation and theory is given by Vogel et al. in Electronics, October 27, 1961, pages 40–47, and by Boyd et al. in Physical Review Letters 8, April 1, 1962, pages 269–272.

Spaced from the laser 10 and in the path of the coherent light beam 20 is a light modulator. Any known light modulating system may be used. The modulating system shown includes right-hand circular polarizer 22. Right-hand circular polarizers are well known and the polarizer 22 may be of any conventional type and material. The coherent light beam which passes through the polarizer 22 will thus be polarized light beam 24.

Spaced from the polarizer 22 and in the path of the polarized light beam 24 is an electro-optic unit 26 which forms a part of the illustrated light modulating system. The electro-optic unit 26 is made of any material which has the property of varying its refractive properties, e.g. by varying the polarization of light passing therethrough, in response to an applied field. An electric field is shown although other types are known and may be used. The electro-optic material 28 may comprise a solid, e.g. a uniaxial crystal such as potassium dihydrogen phosphate or a cubic crystal such as cuprous chloride; a liquid, e.g. nitrobenzene.

The electro-optic unit 26 has the property of varying the state of the polarization of the light that is passed by the unit 26 in response to the application of an electric field. Specifically, the electro-optic unit 26 changes the sense of the circularly polarized light passing through it. Thus, for example, if approximately 7,200 volts are applied to a crystal, of cuprous chloride, of approximately 1 cm. cube, the right-hand circular polarization of the light passed by the crystal 26 is changed to left-hand circular polarization. Smaller degrees of rotation will be provided by smaller voltages in a substantially linear relationship.

An example of an electro-optic unit 26 is a crystal 28 of cuprous chloride having dimensions of approximately 1 cm. cube. Electrical signal energy may be applied to the electro-optic unit by means of a pair of electrodes 30 and 32 which may be made of any electrically conductive material. For purposes of this invention it should be noted that the electrodes 30 and 32 are energized by a modulation signal having a frequency $f_1$.

Spaced from the electro-optic unit 26, and in the path of the light beam 34, is a left-hand circular polarizer 36 which also forms a part of the illustrated light modulation system. Left-hand circular polarizers are well known and the polarizer 36 may be of any conventional type.

The operation of the light modulation system is conventional in that right-hand circularly polarized light 24 will be absorbed by the left-hand circular polarizer 36 when no signal potentials are applied to the electro-optic unit 26. When a signal is applied to the electro-optic unit 26, the polarization of the light 24 is rotated in proportion to the magnitude of the applied signal. Any light which is polarization rotated by the applied modulation signal, at frequency $f_1$, will be passed by the left-hand polarizer 36 in proportion to the magnitude of the applied signal.

Thus, the coherent light beam 38 is amplitude-modulated with a signal at a frequency $f_1$. This modulated light beam may be transmitted to any desired receiving station. It should be clearly understood that the signal modulating system illustrated is merely an example of a light modulating system, and other known light modulating systems may be used with this invention.

Figure 2:
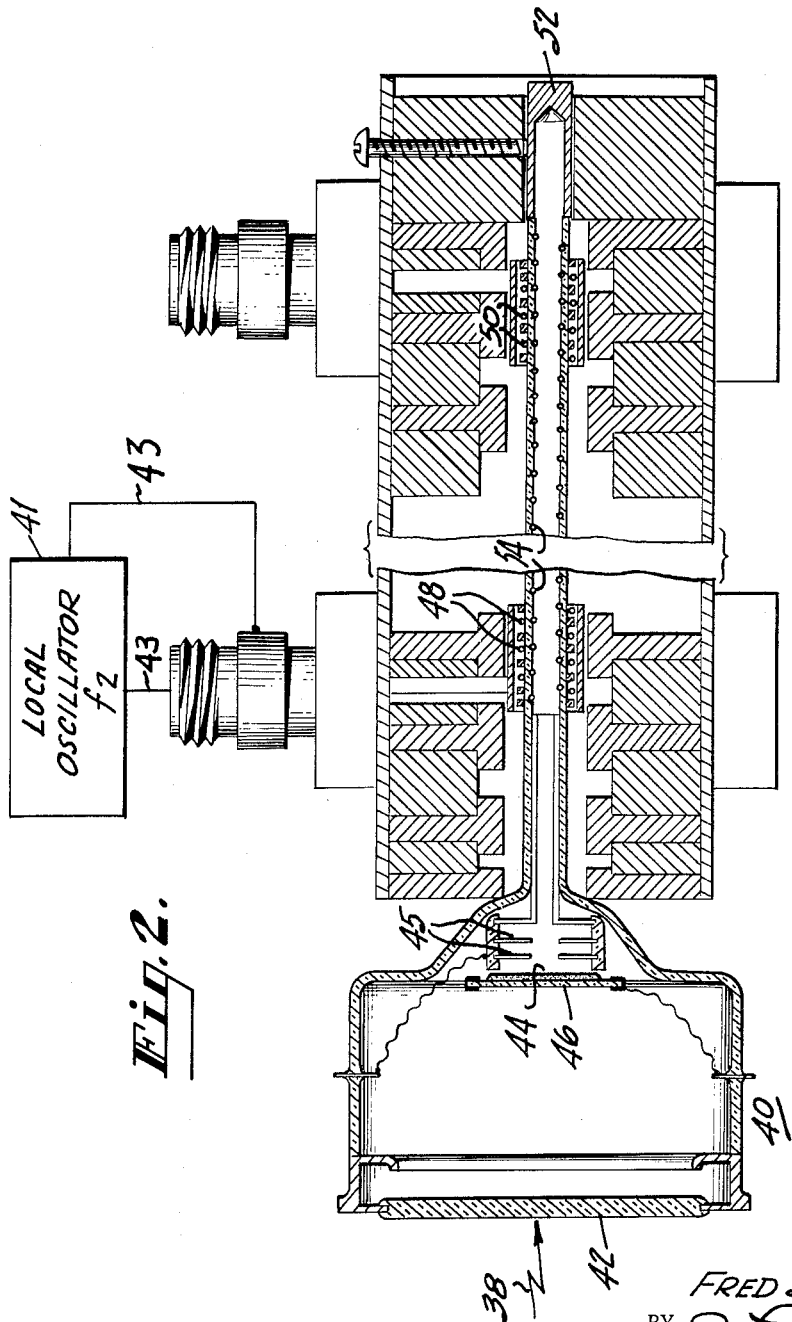
FIG. 2 is a partially schematic illustration of an embodiment of a detector in accordance with this invention.

In FIG. 2, the demodulating system includes a microwave phototube 40 which comprises a window or face plate 42 which is transparent to the incoming modulated coherent light beam 38. The face plate 42 may be made of glass when the beam 38 is in the visible portion of the spectrum. For other wave-lengths other materials substantially transparent thereto may be used. Within the microwave phototube 40 is provided a transmission type photo-emissive cathode 44 which is shown as being positioned upon a light transparent disc 46. The disc 46 may be made of the same material as the face plate 42. Other methods of supporting the photocathode 44 may be used such as depositing the photocathode directly on the inner surface of the face plate 42. Adjacent to the photocathode 44 are one or more accelerating or focussing electrodes 45. The photocathode 44 may comprise any conventional photoemissive surface, examples of which are the S–11 photosurface described in U.S. Patent No. 2,676,282 issued to Polkosky and the S–20 photo-surface described in U.S. Patent No. 2,770,561 issued to Sommers. The photocathode material is selected to have an emission sensitivity that matches the wave-lengths of the light beam 38 to be detected. The microwave phototube 40 is similar to commercially available traveling wave tubes except for the provision of the transparent face plate, the photocathode 44 and the associated accelerating electrodes 45. One example of a conventional tube is the commercially available tube type 4019. Therefore, the tube 40 will not be described in detail.

Spaced from the photocathode 44 is an input coupler 48 which is provided for the purpose of providing an electrically fed local oscillator signal to the microwave phototube 40. The electrical local oscillator signal is produced by a high frequency source 41. The high frequency source 41 may be any conventional radio frequency source such as a reflux klystron. Spaced from the input helix 48 is an output coupler 50 which is provided for the purpose of collecting output signals from the microwave phototube 40. A conventional collector assembly 52 is located at the end of the microwave phototube remote from the photocathode. A helix 54 extends from within the input coupler 48 to within the output coupler 50. The photo-electrons travel from the photocathode 44, axially through the helix 54, to the collector 52.

The operation of the demodulator is such that incoming modulated light beam 38, having a frequency $f_0$, lands on the photocathode 44 to produce photo-electrons in proportion to the magnitude of the light beam 38. Since the light beam 38 is modulated at frequency $f_1$, by the signal applied to the modulator 26 of FIG. 1, the photo-electrons emitted from the photocathode 44 will be "bunched" at a frequency $f_1$. It should be understood that the tube 40 can demodulate a number of simultaneous modulation frequencies, but for simplicity of explanation only one frequency $f_1$ will be described in detail. If no other signal is applied to the microwave phototube 40 these bunched photo-electrons pass through the microwave interaction circuit where they excite an RF wave that is taken out through the coupler 50. Under these conditions, the signals produced in the output coupler 50 will be at the frequency $f_1$. In tubes of the type illustrated, when the helix 54 can interact efficiently with electrons at the frequency $f_1$ the tube will detect the signals. However, if the modulation frequency of the incident light 38 is not within the approximate band of frequencies for which the tube is designed to pass, the signal cannot be detected efficiently by the helix 54 and output signals will not be obtained from the output coupler at this frequency.

When the incident light beam 38 is modulated at a frequency that is outside that which can be passed by the helix 54, the electrical input local oscillator RF signal is provided, by means of the source 41 into the input coupler 48. The electrical local oscillator signal is applied to the input coupler 48 at a frequency $f_2$ by means of a coaxial line 43 which is schematically illustrated. The local oscillator signal is applied to the input coupler 48 and is thus coupled to the "bunched" photo-electrons traveling through the helix 54. The photo-electrons are within at a frequency $f_1$, and the traveling wave from the local oscillator 41 is at a frequency $f_2$, and the two will interact as they travel through the helix 54. Therefore, the output coupler 50 will provide a signal at the sum frequencies $f_1$ plu $f_2$ or the difference frequencies $$|f_1 \text{ minus } f_2|$$

of the two signals. Since the sum frequency band, or the difference frequency band, or the original pass band of the helix, are all three available, the range of incoming frequencies that can be selected to be passed, or selectively heterodyned to be passed, by the helix 54 is substantially broader than in prior art.

The frequency $f_2$ of the local electrical oscillator 41 is selected so that either the difference signal frequency $|f_1-f_2|$ or the sum frequency $f_1+f_2$ is within the range of frequencies than can be efficiently propagated by the helix 54.

Normally, the input light beam 38 is modulated at an extremely high frequency. Therefore, the difference signal $|f_1-f_2|$ will usually be the signal that is detected, or heterodyned, by the demodulator 40. By utilizing the difference signal, extremely high frequencies may be detected and demodulated by the microwave phototube 40. As an example, frequencies as high as $4 \times 10^9$ c.p.s. have been demodulated with a tube having a 1 to $2.2 \times 10^9$ c.p.s. helix using this invention.

Figure 3:
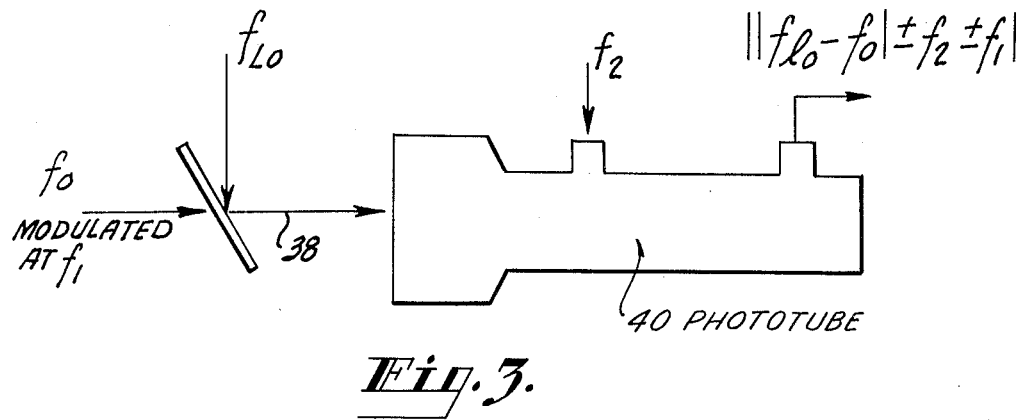
FIG. 3 is a schematic illustration of another embodiment in accordance with this invention employing a multiple heterodyne detector.

In the device shown in FIG. 3, a light beam 38 of frequency $f_0$ (e.g. $500 \times 10^{12}$ c.p.s.) is modulated at frequency $f_1$ (e.g. $4 \times 10^6$ c.p.s.) by means such as that shown in FIG 1. The modulated light beam 38 is fed into a microwave phototube detector 40. Also fed into the detector tube 40 is an electrical local oscillator signal at frequency $f_2$ (e.g. $2.2 \times 10^9$ c.p.s.) as has been explained in connection with FIG. 2. Still further, the photocathode 44 is simultaneously illuminated by a coherent local oscillator light beam of optical frequency $f_{10}$ (e.g. $500 \times 10^{12}$ c.p.s.$+4 \times 10^9$ c.p.s.). The wave front of the beam $f_{10}$ is arranged to be parallel to the wave front of the incoming light beam 38 to be demodulated by means such as a half silvered mirror 39. The optical local oscillator signal $f_{10}$ may be provided by a second laser device, similar to device 10 shown in FIG. 1, which produces a laser beam at a slightly different frequency (e.g. $500 \times 10^{12}$ c.p.s.$+4 \times 10^9$ c.p.s.).

Because of interference between the optical local oscillator signal $f_{10}$ and the light beam 38, the density of photons arriving at the photocathode 44 will vary at the sum or difference frequency rate $(f_{10}-f_0 \pm f_1)$, where $f_0$ is the original unmodulated light frequency. Therefore, the photo-electrons from the photocathode are bunched at the sum or difference frequency of the optical local oscillator, the original laser frequency and the modulating frequency. As an example, assume the difference frequency, the bunching would be $|f_{10}-f_0|\pm f_1$ resulting in a frequency of $4 \times 10^9$ c.p.s.$\pm 4 \times 10^6$ c.p.s. in the example given. The frequency of the optical local oscillator is chosen for high signal-to-noise ratio and to eliminate background noise, since light outside the selected IF band will not be detected.

Radio frequency mixing is also provided in the tube illustrated in FIG. 3 by applying an electrical local oscillator signal $f_2$ ($2.2 \times 10^9$ c.p.s.) in addition to the optical heterodyning provided by the optical local oscillator $f_{10}$. Then, the output signal is the sum and/or the difference of all three signals, for example, and again using only the difference frequency $||f_{10}-f_0|\pm f_1-f_2|$, or $$1.8 \times 10^9 \text{ c.p.s.} \pm 4 \times 10^6 \text{ c.p.s.}$$

in the example.

Thus, the frequency of the optical local oscillator and the electrical local oscillator 41 are selected so that the resulting heterodyned frequency is in the pass band (e.g. 1 to $2.2 \times 10^9$ c.p.s. in the example) of the phototube 40. Thus, by proper selection of the frequency $f_{10}$ and $f_2$, the frequency range of the microwave phototube assembly 40 may be selectively extended to extremely high modulation frequencies. The optical heterodyning illustrated in FIG. 3 can be shown to increase the available gain and power output for low signal levels.

In both of the embodiments of this invention, the light demodulator tube may be made substantially shorter than the prior art tubes. The reason for this is that the high electric field of the local oscillator RF signal, substantially decreases the speed of the photo-electrons, as they trvael through the helix, resulting in the extraction of substantially all of the RF energy in a shorter distance.

What is claimed is:

1. A system for demodulating a modulated light beam comprising, means for converting said light beam into a beam of photo-electrons, an electrical source of beat frequency oscillations, and means acting on said beam of photo-electrons for heterodyning said photo-electron beam with said beat frequency oscillations for providing a traveling wave substantially at one of the sum and the difference frequency of the modulation frequency of said light beam and said beat frequency oscillations.

2. A system for demodulating a modulated light beam comprising a traveling wave tube having a photosensitive cathode, means for directing said light beam at said photocathode for producing a stream of photo-electrons, an electrical source of oscillations, and means acting on said stream of photo-electrons for heterodyning said local oscillations with said photo-electrons for producing a traveling wave substantially at one of the sum frequency and the difference frequency of said oscillations and the modulation frequency of said light beam.

3. A system for demodulating a light beam comprising a photosensitive traveling wave tube, an electrical source of local oscillations, means for coupling said electrical source of local oscillations to said traveling wave tube to provide a first traveling wave, means for directing a signal modulated light beam onto said tube to provide an electron beam, said electron beam being modulated at a frequency substantially equal to the modulation frequency of said light beam, said local oscillations having a frequency substantially different from said modulation frequency, whereby said electron beam and said local oscillations are heterodyned to produce a sum frequency and a difference frequency composite traveling wave, output means in said tube, and one of said sum frequency and said differenct frequency being within the range of frequencies detectable by said output means of said traveling wave tube.

4. A system for demodulating a light beam comprising a traveling wave tube having a photosensitive cathode, means for directing a modulated light beam onto said photosensitive cathode for producing photo-electrons, an electrical source of local oscillations, a local optical source of light, means for directing light onto said photosensitive cathode from said local optical source, and means for coupling local oscillations from said electrical source to said traveling wave tube to produce a traveling wave in said traveling wave tube, output means in said traveling wave tube, the output of said traveling wave tube being sensitive to one of the sum frequency and the difference frequency of the combination of said photo-electrons and said local optical light source and said local electrical source of oscillations.

5. The method of demodulating a modulated light beam comprising the steps of producing a beam of photo-electrons modulated substantially at the frequency of modulation of said modulated light beam, heterodyning a first traveling wave with said beam of photo-electrons for producing a second traveling wave, and detecting one of the sum frequency and the difference frequency.

6. The method of demodulating a modulated light beam comprising the steps of converting said light beam into a beam of photo-electrons, producing a first traveling wave from said photo-electrons, heterodyning a second traveling wave from an electrical local oscillator with said first traveling wave, and detecting one of the sum frequency and the difference frequency.

7. A system for detecting the modulation on a light beam comprising a traveling wave tube, at least a photosensitive cathode and an output helix in said traveling wave tube, means for directing said light beam onto said photosensitive cathode to provide a beam of electrons from said photosensitive cathode modulated substantially at the modulation frequency of said light beam, an electrical local oscillator connected to said traveling wave tube, and the output helix of said traveling wave tube being sensitive to one of the sum frequency and the difference frequency of said beam of electrons and said local oscillator.

References Cited by the Examiner
UNITED STATES PATENTS 2,265,784   12/1941   Von Baeyer _____ 250—199

OTHER REFERENCES

Forrester et al.: Physical Review, vol. 99, No. 6, Sept. 15, 1955, pages 1691–1700.

Forrester: Journal Opt. Soc. Ameri., vol. 51, No. 3, March 1961, pp. 253–259.

McMurtry et al.: Applied Optics, vol. 1, No. 1, January 1962, pp. 51–53.

Radio-Electronics, August 1962, pp. 6, 8.

DAVID G. REDINBAUGH, *Primary Examiner.*

STEPHEN W. CAPELLI, *Examiner.*